United States Patent
Higham et al.

(10) Patent No.: US 7,814,361 B2
(45) Date of Patent: Oct. 12, 2010

(54) SYSTEM AND METHOD FOR SYNCHRONIZING REDUNDANT DATA IN A STORAGE ARRAY

(75) Inventors: Gabriel Higham, Pflugerville, TX (US); Srinivasan Kadathur, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 564 days.

(21) Appl. No.: 11/871,258

(22) Filed: Oct. 12, 2007

(65) Prior Publication Data

US 2009/0100284 A1    Apr. 16, 2009

(51) Int. Cl.
*G06F 1/12*       (2006.01)
*G06F 1/00*       (2006.01)
*G06F 12/00*      (2006.01)
*G06F 13/00*      (2006.01)
*G06F 11/00*      (2006.01)
*G11C 29/00*      (2006.01)
*H03M 13/03*      (2006.01)

(52) U.S. Cl. .................. 713/400; 713/300; 711/112; 711/135; 711/141; 714/6; 714/765; 714/789; 714/798

(58) Field of Classification Search .................. 713/300, 713/400; 711/112, 135, 141; 714/6, 765, 714/789, 798
See application file for complete search history.

(56) References Cited

U.S. PATENT DOCUMENTS

| | | |
|---|---|---|
| 5,787,459 A | 7/1998 | Stallmo et al. ............. 711/112 |
| 5,913,927 A | 6/1999 | Nagaraj et al. .................. 714/8 |
| 6,490,659 B1 | 12/2002 | McKean et al. ............. 711/141 |
| 6,516,425 B1 | 2/2003 | Belhadj et al. .................. 714/6 |
| 6,549,977 B1 | 4/2003 | Horst et al. .................. 711/113 |
| 6,567,892 B1 | 5/2003 | Horst et al. .................. 711/114 |
| 6,728,898 B2 * | 4/2004 | Tremblay et al. ............... 714/6 |
| 7,062,675 B1 * | 6/2006 | Kemeny et al. ............... 714/15 |
| 7,441,081 B2 * | 10/2008 | Humlicek .................... 711/113 |
| 2005/0210318 A1 | 9/2005 | Marks et al. .................... 714/7 |
| 2006/0041782 A1 | 2/2006 | Ali et al. .......................... 714/6 |
| 2006/0041793 A1 | 2/2006 | Cherian et al. ................ 714/47 |
| 2006/0136765 A1 * | 6/2006 | Poisner et al. .............. 713/323 |
| 2007/0050544 A1 | 3/2007 | Chawla et al. .............. 711/114 |

* cited by examiner

*Primary Examiner*—Stefan Stoynov
(74) *Attorney, Agent, or Firm*—Baker Botts L.L.P.

(57) ABSTRACT

Systems and methods for synchronizing redundant data in a storage array are disclosed. In accordance with a method, a pointer indicating the amount of data synchronized between a first storage resource to a second storage resource may be maintained and a power event may be detected. In response to the detection of the power event, an attempt may be made to flush a write cache associated with the second storage resource to transfer data from the write cache to a non-volatile storage area of the second storage resource. A determination may be made whether the attempt to flush the write cache is successful. In response to determining that the attempt to flush the write cache is successful, a flag may be set to indicate that the pointer accurately indicates the amount of data mirrored from the first storage resource to the non-volatile storage area of the second storage resource.

21 Claims, 2 Drawing Sheets

SYSTEM AND METHOD FOR SYNCHRONIZING REDUNDANT DATA IN A STORAGE ARRAY

TECHNICAL FIELD

The present disclosure relates in general to input/output (I/O) communication, and more particularly to rebuilding and resynchronization of redundant data in a storage array.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "logical unit." Implementations of storage resource arrays can range from a few storage resources disposed in a server chassis, to hundreds of storage resources disposed in one or more separate storage enclosures.

Many storage arrays enable redundancy by "mirroring," in which an exact copy of data on one logical unit is copied onto one or more other logical units. One of the challenges associated with providing redundancy in storage arrays, particularly in mirrored storage arrays such as RAID 1 arrays, is maintaining the synchronization of data between a logical unit including "original" data, and the one or more logical units including the mirrored data. Ideally, anytime a data write is made to the logical unit including the original data, a write should also be instantaneously made to the logical units including the mirrored data, so as to maintain one-to-one correspondence between logical units, thereby providing the greatest level of data integrity.

In order to provide maximum data integrity, traditional approaches to ensuring data integrity in a mirrored storage array often sacrifice speed and performance. To illustrate, many hard disk drives making up logical units include a write cache. Write caches are often used to increase access to data. Such data may created when a host operating system stores data on a logical unit including permanent data storage. Rather than immediately store the data onto a storage resource's non-volatile storage (e.g., hard disk drives), for example, the storage resource's controller may store the data into its high-speed cache and signal to the host operating system that the data has been successfully stored. This significantly speeds up the acknowledgment back to the host operating system that the data has been successfully stored. Then, when it is convenient to the data storage system, the data in the write cache is flushed to the hard drive, where it becomes "permanently" stored.

Until the write cache data is actually stored on the hard disk drive, it remains "dirty." The term "dirty" indicates that write cache data has yet to be written to permanent data storage. Because most, if not all, write cache memories are volatile memories that need electric power in order to store data, this data is vulnerable to being permanently lost if there is a power outage or other power event (e.g., sleep mode and/or standby).

Because write caches often include volatile memory that loses data when powered down, and because modern storage controllers are often unable to distinguish between writes to a drive and writes to a drive's write cache, write caches are not often employed in mirrored storage arrays. To illustrate, consider a mirrored storage array including two hard disk drives, Drive A and Drive B, in which Drive B serves as the mirror to Drive A, and Drive B includes an enabled write cache. If data written to Drive A is to be mirrored on Drive B, such data may first be written to Drive B's write cache prior to being transferred to the non-volatile storage of Drive B. If an event occurs causing loss of power to Drive B or its write cache, data stored in Drive B's write cache and not yet written to the non-volatile storage of Drive B may be lost, thus leaving Drive B out of synchronization with Drive A, and placing data integrity at risk. Thus, in certain instances, information handling system firmware may "think" certain data has been mirrored to Drive B, when in fact such data was lost from Drive B's write cache during a power event. This problem may occur not only in the event of a power-down of an information handling system comprising Drive B, but may also occur as a result of any power event (e.g., a "sleep mode" or "standby mode"), as modern storage controllers are often unable to distinguish between various power events.

SUMMARY

In accordance with the teachings of the present disclosure, the disadvantages and problems associated with providing redundancy in a storage array have been substantially reduced or eliminated.

In accordance with one embodiment of the present disclosure, a method for synchronization of data in a redundant storage array is provided. A pointer indicating the amount of data synchronized between a first storage resource to a second storage resource may be maintained and a power event may be detected. In response to the detection of the power event, an attempt may be made to flush a write cache associated with the second storage resource to transfer data from the write cache to a non-volatile storage area of the second storage resource. A determination may be made whether the attempt to flush the write cache is successful. In response to determining that the attempt to flush the write cache is successful, a flag may be set to indicate that the pointer accurately indicates the amount of data mirrored from the first storage resource to the non-volatile storage area of the second storage resource.

In accordance with another embodiment of the present disclosure, a system for synchronization of data in a redundant storage array comprising includes a first storage resource, a second storage resource associated with the first storage resource, at least one non-volatile memory communicatively coupled to the first storage resource and the second storage resource, and at least one device coupled to the first storage resource and the second storage resource. The second storage resource may have a write cache and a non-volatile storage area. The at least one non-volatile memory may include a pointer indicating the amount of data mirrored from the first storage resource to the second storage resource and a flag indicating whether the pointer accurately indicates the amount of data mirrored from the first storage resource to the non-volatile storage area of the second storage resource. The at least one device may be configured to flush the write cache in order to transfer data from the write cache to the non-volatile storage area of the second storage resource in response to detection of a power event.

In accordance with a further embodiment of the present disclosure, an information handling system includes a processor, a memory communicatively coupled to the processor, a first storage resource communicatively coupled to the processor, a second storage resource communicatively coupled with the processor and associated with the first storage resource, at least one non-volatile memory communicatively coupled to the first storage resource and the second storage resource, and at least one device coupled to the first storage resource and the second storage resource. The second storage resource may have a write cache and a non-volatile storage area. The at least one non-volatile memory may include a pointer indicating the amount of data mirrored from the first storage resource to the second storage resource and a flag indicating whether the pointer accurately indicates the amount of data mirrored from the first storage resource to the non-volatile storage area of the second storage resource. The at least one device may be configured to flush the write cache in order to transfer data from the write cache to the non-volatile storage area of the second storage resource in response to detection of a power event.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
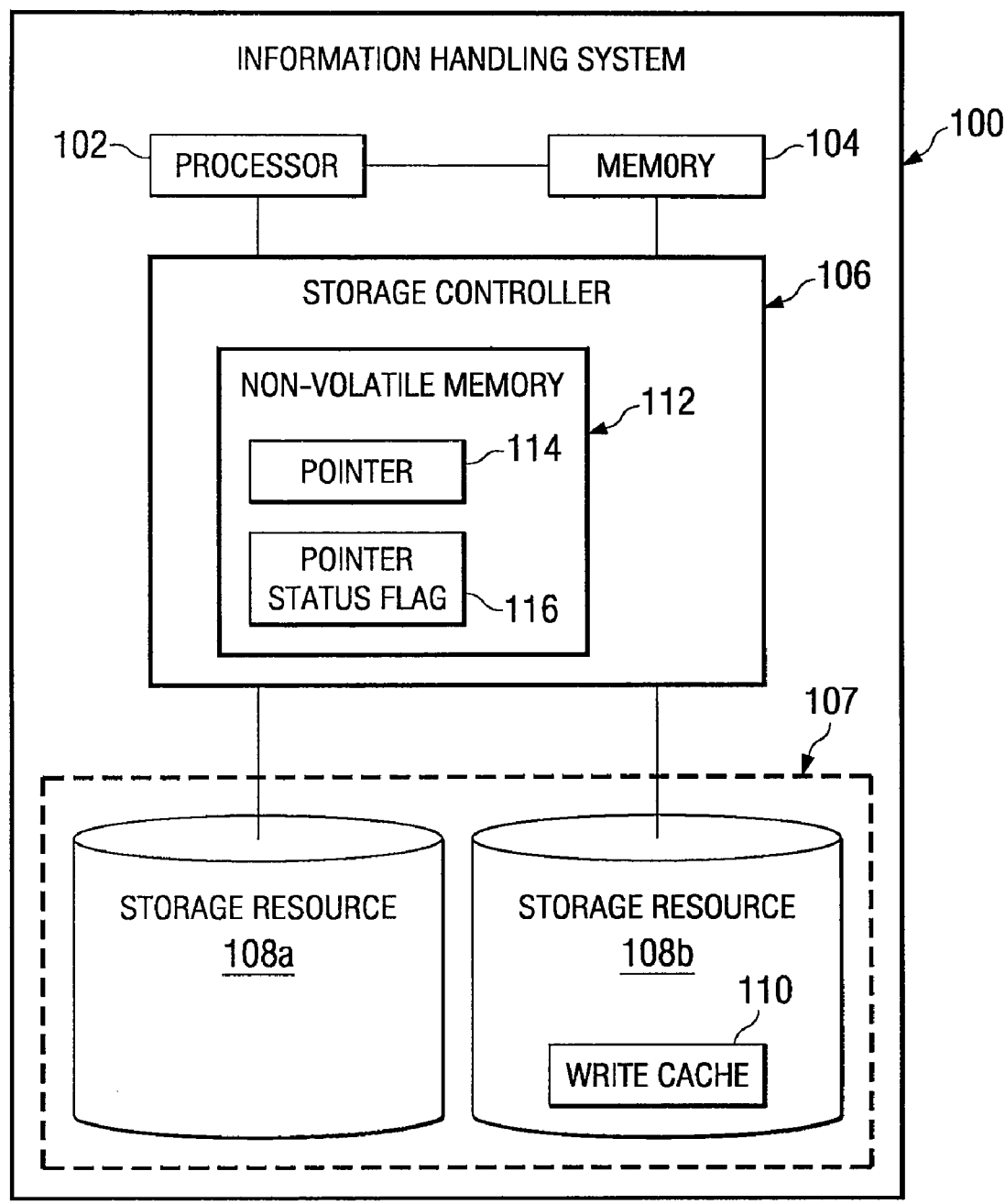
FIG. 1 illustrates a block diagram of an example information handling system for synchronizing redundant data in a storage array, in accordance with the present disclosure.
Figure 2:
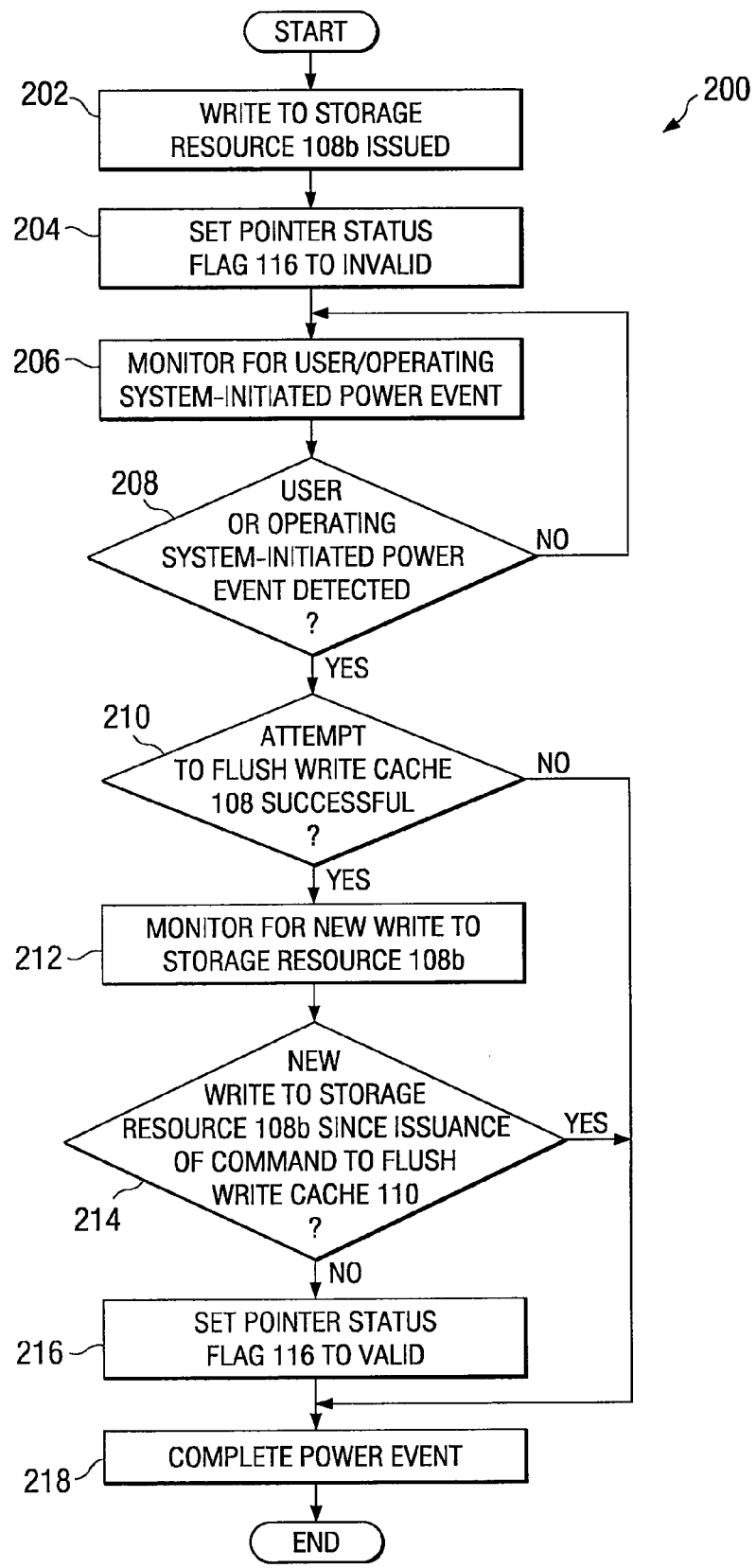
FIG. 2 illustrates a flow chart of an example method for synchronizing redundant data in a storage array, in accordance with an embodiment of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

As discussed above, an information handling system may include or may be coupled via a storage network to an array of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example information handling system 100 for synchronizing redundant data in a storage array 107, in accordance with the present disclosure. As depicted in FIG. 1, information handling system 100 may comprise a processor 102, a memory 104 communicatively coupled to processor 102, a storage controller 106 communicatively coupled to processor 102, and a storage array 107 communicatively coupled to storage controller 106. In certain embodiments, information handling system 100 may comprise a server. In other embodiments, information handling system 100 may comprise a personal computer (e.g., a desktop computer, laptop computer, mobile computer, notebook computer, and/or handheld computer).

Processor 102 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104 and/or another component of information handling system 100. In the same or alternative embodiments, processor 102 may communicate data to and/or from storage array 107 via storage controller 106.

Memory 104 may be communicatively coupled to processor 102 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 100 is turned off.

Storage controller 106 may be communicatively coupled to processor 102 and/or memory 104 and include any system, apparatus, or device operable to manage the communication of data between storage array 107 and one or more of processor 102 and memory 104. In certain embodiments, storage controller 106 may provide functionality including, without limitation, disk aggregation and redundancy (e.g., RAID), input/output (I/O) routing, and error detection and recovery. Storage controller 106 may be implemented using hardware, software, or any combination thereof. As depicted, storage controller 106 may include a non-volatile memory 112 that further includes a pointer 114 and pointer status flag 116. Pointer 114 and pointer status flag 116 are discussed in greater detail below.

Although FIG. 1 depicts a single storage controller 106 associated with each of storage resources 108*a* and 108*b*, information handling system 100 may include any suitable number of storage controllers 106. For example, in certain embodiments, information handling system 100 may include a separate storage controller 106 for each storage resource 108.

Storage array 107 may comprise one or more storage resources 108, and may be communicatively coupled to processor 102 and/or memory 104 via storage controller 106. Storage resources 108 may include hard disk drives, magnetic tape libraries, optical disk drives, magneto-optical disk drives, compact disk drives, compact disk arrays, disk array controllers, and/or any computer-readable medium operable to store data. In operation, storage controller 106 and storage array 107 may interact such that one or more storage resources 108 may appear to an operating system executing on information handling system 100 as a single logical storage unit or virtual storage resource. Thus, processor 102 may "see" a single virtual storage resource instead of seeing each individual storage resources 108*a* and 108*b*. Although in the embodiment depicted in FIG. 1 storage array 107 is shown as including two storage resources 108, storage array 107 and/or any virtual storage resource comprising storage array 107 may include any number of storage resources 108.

Although FIG. 1 depicts that storage resources 108 are disposed locally within information handling system 100, storage resources 108 may be communicatively coupled to processor 102 and/or memory 104 in any suitable manner. For example, in certain embodiments, storage array 107 may be communicatively coupled to information handling system 100 via a network. Any such network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data).

In the same or alternative embodiments, one or more storage resources 108 may be disposed within a storage enclosure configured to hold and power one or more storage resources 108. In such embodiments, such storage enclosures may be communicatively coupled to information handling system 100 and/or one or more of its components, in order to facilitate communication of data between storage resources 108 and at least one of processor 102 and/or memory 104.

Data may be transmitted among processor 102, memory 104, storage controller 106, and storage resources 108 using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCI (SAS), any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

As depicted in FIG. 1, storage resource 108*b* may include a write cache 110. Write cache 110 may comprise any computer-readable medium communicatively coupled to non-volatile storage disposed within storage resource 108*b* and may increase the speed of writing data to storage resource 108*b*. Although FIG. 1 depicts that write cache 110 is disposed within storage resource 108*b*, write cache 110 may be disposed in any suitable physical location within information handling system 100. For example, in certain embodiments, write cache 110 may be disposed within storage controller 106 or another storage controller associated with storage resource 108*a*.

In operation, the storage resources 108 making up storage array 107 may provide data redundancy for data stored to one or more of storage resources 108. For example, in one embodiment, storage array 107 may comprise a RAID 1, in which data to be stored may be written to storage resource 108*a*, with an exact copy written to storage resource 108*b*. Although (for the sake of simplicity) FIG. 1 depicts a RAID 1, and much of the following discussion is related to the application of the present disclosure to RAID 1, storage array 107 may comprise any suitable RAID implementation and/or other suitable redundancy approach.

As mentioned above, during a typical data synchronization process, data written to storage resource 108*a* may also be written to storage resource 108*b*. To track the amount of data that has been mirrored on storage resource 108*b*, storage controller 106 and/or another component of information handling system 100 may include a pointer 114 (embodied in hardware, software, and or any combination thereof) that indicates the amount of data that has been synchronized between storage resources 108*a* and 108*b*. For example, at a given point in a synchronization process, a certain percentage of data (e.g., 50%) may be synchronized between storage resources 108*a* and 108*b*, meaning that the specified percentage of data has been copied from storage resource 108*a* to storage resource 108*b*. Accordingly, pointer 114 may indicate that such percentage of data has been synchronized between storage resources 108*a* and 108*b*. However, as mentioned above, modern storage controllers may not be able to differentiate between writes to the non-volatile storage of storage resource 108*b* and its associated write cache 110. Hence, pointer 114 may indicate that data has been synchronized between storage resources 108*a* and 108*b*, even though some of the data written to storage resource 108*b* may be stored only in write cache 110 (i.e., not yet written to storage resource 108b) and may be lost in a power event.

Storage controller 106 and/or another component of information handling system 100 may also include a pointer status flag 116 (embodied in hardware, software, and or any combination thereof) operable to indicate whether pointer 114 accurately represents the amount of data synchronized on the non-volatile storage portion of storage resource 108b, as described in greater detail with respect to FIG. 2 below.

In operation, pointer status flag 116 may be set by default to a value (e.g., "INVALID" or "FALSE") indicating that that the value of pointer 114 does not accurately indicate the amount of data synchronized between storage resource 108a and the non-volatile storage of storage resource 108b. In response to a user- or operating system-initiated power event (e.g., controlled shutdown, standby mode, or power saving mode), storage controller 106 and/or another component of information handling system 100 may issue a command to storage resource 108b to "flush" its associated write cache 110 by transferring all data within write cache 110 to the non-volatile storage of storage resource 108b. If the flush or write cache 110 is successful, and no more I/O write events (e.g., a WRITE command) occur between the initiation and completion of the power event, pointer status flag 116 may be set with a value (e.g., "VALID" or "TRUE") indicating that the value of pointer 114 accurately indicates the amount of data synchronized between storage resource 108a and the non-volatile storage of storage resource 108b. On the other hand, if an I/O event (e.g., a WRITE command) occurs between the initiation and completion of the power event, pointer status flag 116 may retain a value indicating that the value of pointer 114 does not accurately indicate the amount of data synchronized between storage resource 108a and the non-volatile storage of storage resource 108b.

As a result, after completion of a power event, pointer status flag 116 may indicate the accuracy of pointer 114, and thus provide an indication of the integrity of synchronization between storage resources 108a and 108b. Accordingly, on a subsequent re-powering of information handling system 100, if pointer status flag 116 has a value of "VALID" or "TRUE," synchronization may be continued from the point indicated by pointer 114. On the other hand, if pointer status flag 116 has a value of "INVALID" or "FALSE" (as may be the case, e.g., due to a power outage or other "hard" power event in which write cache 110 cannot be flushed), synchronization may be started from scratch, to ensure all data is adequately synchronized between storage resources 108a and 108b.

FIG. 2 illustrates a flow chart of an example method 200 for synchronizing redundant data in a storage array (e.g., storage array 107), in accordance with the present disclosure. In one embodiment, method 200 comprises using pointer status flag 116 to track whether pointer 114 accurately indicates a portion of data transferred to the non-volatile storage area of a redundant storage resource (e.g., storage resource 108b).

According to one embodiment, method 200 preferably begins at step 202. As noted above, teachings of the present disclosure may be implemented in a variety of configurations of information handling system 100. As such, the preferred initialization point for method 200 and the order of the steps 202-218 comprising method 200 may depend on the implementation chosen.

At step 202, a WRITE command to storage resource 108b may be issued. Such WRITE command may be associated with synchronization between storage resources 108a and 108b. As a result of the WRITE command of step 202, a portion of the data to be synchronized between storage resource 108a and storage resource 108b may be written to write cache 110 of storage resource 108b, but not yet to non-volatile storage of storage resource 108b, meaning pointer 114 may not accurately indicate the amount of synchronization between storage resource 108a and the non-volatile storage of storage resource 108b. Accordingly, at step 204, pointer status flag 116 may be set to "INVALID" or "FALSE."

At step 206, the operating system of information handling system 100, storage controller 106, and/or another component of information handling system 110 may monitor for a user or operating system-initiated power event. At step 208, a determination may be made as to whether a user- or operating system-initiated power event is detected. If such an event is detected method 200 may proceed to step 210. Otherwise, method 200 may proceed to step 206, where monitoring for a user or operating system-initiated power event may continue.

At step 210, the operating system of information handling system 100, storage controller 106, and/or another component of information handling system 100 may issue a command to flush write cache 110, in an attempt to write all data within write cache 110 to the non-volatile storage of storage resource 108b prior to completion of the power event. If the attempt to flush write cache 108 is successful, method 200 may proceed to step 212. Otherwise, if the attempt to flush write cache is unsuccessful, method 200 may proceed to step 218.

At step 212, the operating system of information handling system 100, storage controller 106, and/or another component of information handling system 100 may monitor for a new WRITE command and/or other I/O event to storage resource 108b. At step 214, a determination may be made as to whether a new I/O event to storage resource 108b has occurred since the issuance of the command to flush write cache 110. If a new I/O event has occurred, method 200 may proceed to step 218 where the power event may complete with status pointer flag 116 remaining set as "INVALID" or "FALSE" as the new I/O event may cause pointer 114 to inaccurately indicate the amount of synchronization. On the other hand, if no new I/O events have occurred, method 200 may proceed to step 216.

At step 216, status pointer flag 116 may be set to "VALID" or "TRUE," indicating that pointer 114 accurately indicates the amount of synchronization. At step 218, the power event may complete. After step 218, method 200 may end.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 100 or any other system operable to implement method 200. In certain embodiments, method 200 may be implemented partially or fully in software embodied in tangible computer readable media.

Using the methods and systems disclosed herein, problems associated conventional approaches synchronizing data in a redundant storage array may be improved, reduced or eliminated. For example, the methods and systems disclosed may allow for assurance of data integrity in redundant systems, while allowing fast and efficient synchronization through use of a write cache.

Although the present disclosure has been described in detail, it should be understood that various changes, substitutions, and alterations can be made hereto without departing from the spirit and the scope of the disclosure as defined by the appended claims.

What is claimed is:

1. A method for synchronization of data in a redundant storage array, comprising:
    maintaining a pointer indicating the amount of data synchronized between a first storage resource to a second storage resource;
    detecting a power event;
    in response to the detection of the power event, attempting to flush a write cache associated with the second storage resource to transfer data from the write cache to a non-volatile storage area of the second storage resource;
    determining whether the attempt to flush the write cache is successful; and
    in response to determining that the attempt to flush the write cache is successful, setting a flag to indicate that the pointer accurately indicates the amount of data mirrored from the first storage resource to the non-volatile storage area of the second storage resource.

2. A method according to claim 1, further comprising setting the flag to indicate that the pointer does not accurately indicate the amount of data mirrored from the first storage resource to the non-volatile storage area of the second storage resource, in response to an input/output event associated with the second storage resource.

3. A method according to claim 2, further comprising:
    in response to a determination that the flag indicates that the pointer does not accurately indicate the amount of data mirrored from the first storage resource to the non-volatile storage area of the second storage resource, resetting the pointer; and
    synchronizing data between the first storage resource and the second storage resource as if no previous synchronization had occurred.

4. A method according to claim 1, further comprising:
    in response to the detection of the power event, monitoring for an input/output event associated with the second storage resource; and
    setting the flag to indicate that the pointer does not accurately indicate the amount of data mirrored from the first storage resource to the non-volatile storage area of the second storage resource, in response to the input/output event associated with the second storage resource.

5. A method according to claim 4, further comprising:
    in response to a determination that the flag indicates that the pointer does not accurately indicate the amount of data mirrored from the first storage resource to the non-volatile storage area of the second storage resource, resetting the pointer; and
    synchronizing data between the first storage resource and the second storage resource as if no previous synchronization had occurred.

6. A method according to claim 1, further comprising continuing synchronization of data between the first storage resource and the second storage resource based at least on a value of the pointer.

7. A method according to claim 1, wherein the power event is at least one of user-initiated power event and an operating system-initiated power event.

8. A method according to claim 1, further comprising, in response to determining that the attempt to flush the write cache is unsuccessful, setting the flag to indicate that the pointer does not accurately indicate the amount of data mirrored from the first storage resource to the non-volatile storage area of the second storage resource.

9. A system for synchronization of data in a redundant storage array comprising:
    a first storage resource;
    a second storage resource associated with the first storage resource, the second storage resource having a write cache and a non-volatile storage area;
    at least one non-volatile memory communicatively coupled to the first storage resource and the second storage resource, the at least one non-volatile memory including:
        a pointer indicating the amount of data mirrored from the first storage resource to the second storage resource; and
        a flag indicating whether the pointer accurately indicates the amount of data mirrored from the first storage resource to the non-volatile storage area of the second storage resource; and
    at least one device coupled to the first storage resource and the second storage resource and configured to flush the write cache in order to transfer data from the write cache to the non-volatile storage area of the second storage resource in response to detection of a power event.

10. A system according to claim 9, further comprising the flag configured to indicate that the pointer does not accurately indicate the amount of data mirrored from the first storage resource to the non-volatile storage area of the second storage resource, in response to an input/output event associated with the second storage resource.

11. A system according to claim 10, further comprising the at least one device configured to:
    in response to a determination that the flag indicates that the pointer does not accurately indicate the amount of data mirrored from the first storage resource to the non-volatile storage area of the second storage resource, reset the pointer; and
    synchronize data between the first storage resource and the second storage resource as if no previous synchronization had occurred.

12. A system according to claim 9, further comprising:
    the at least one device configured to monitor for an input/output event associated with the second storage resource in response to the detection of the power event; and
    the flag configured to indicate that the pointer does not accurately indicate the amount of data mirrored from the first storage resource to the non-volatile storage area of the second storage resource, in response to the input/output event associated with the second storage resource.

13. A system according to claim 12, further comprising the at least one device configured to:
    in response to a determination that the flag indicates that the pointer does not accurately indicate the amount of data mirrored from the first storage resource to the non-volatile storage area of the second storage resource, reset the pointer; and
    synchronize data between the first storage resource and the second storage resource as if no previous synchronization had occurred.

14. A system according to claim 9, further comprising the second storage resource configured to continue synchronization of data between the first storage resource and the second storage resource based at least on a value of the pointer.

15. A system according to claim 9, wherein the power event is at least one of user-initiated power event and an operating system-initiated power event.

16. An information handling system comprising:
    a processor;

a memory communicatively coupled to the processor
a first storage resource communicatively coupled to the processor;
a second storage resource communicatively coupled with the processor and associated with the first storage resource, the second storage resource having a write cache and a non-volatile storage area;
at least one non-volatile memory communicatively coupled to the first storage resource and the second storage resource, the at least one non-volatile memory including:
a pointer indicating the amount of data mirrored from a storage resource to the second storage resource; and
a flag indicating whether the pointer accurately indicates the amount of data mirrored from the first storage resource to the non-volatile storage area of the second storage resource; and
at least one device coupled to the first storage resource and the second storage resource and configured to flush the write cache in order to transfer data from the write cache to the non-volatile storage area of the second storage resource in response to detection of a power event.

17. An information handling system according to claim 16, further comprising the flag configured to indicate that the pointer does not accurately indicate the amount of data mirrored from the first storage resource to the non-volatile storage area of the second storage resource, in response to an input/output event associated with the second storage resource.

18. An information handling system according to claim 17, further comprising the at least one device configured to:
in response to a determination that the flag indicates that the pointer does not accurately indicate the amount of data mirrored from the first storage resource to the non-volatile storage area of the second storage resource, reset the pointer; and
synchronize data between the first storage resource and the second storage resource as if no previous synchronization had occurred.

19. An information handling system according to claim 16, further comprising: the at least one device configured to monitor for an input/output event associated with the second storage resource in response to the detection of the power event; and
the flag configured to indicate that the pointer does not accurately indicate the amount of data mirrored from the first storage resource to the non-volatile storage area of the second storage resource, in response to the input/output event associated with the associated redundant storage resource.

20. An information handling system according to claim 19, further comprising the at least one device configured to:
in response to a determination that the flag indicates that the pointer does not accurately indicate the amount of data mirrored from the first storage resource to the non-volatile storage area of the second storage resource, reset the pointer; and
synchronize data between the first storage resource and the second storage resource as if no previous synchronization had occurred.

21. An information handling system according to claim 16, further comprising the second storage resource configured to continue synchronization of data between the first storage resource and the second storage resource based at least on a value of the pointer.

* * * * *